US009566906B2

(12) United States Patent
Lee

(10) Patent No.: US 9,566,906 B2
(45) Date of Patent: Feb. 14, 2017

(54) APPARATUS AND METHOD FOR CONTROLLING VIRTUAL ENGINE SOUND IN RESPONSE TO AUTO-CRUISE SPEED SETTINGS

(71) Applicant: HYUNDAI MOBIS CO., LTD., Seoul (KR)

(72) Inventor: Jun Woo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 170 days.

(21) Appl. No.: 14/484,085

(22) Filed: Sep. 11, 2014

(65) Prior Publication Data
US 2015/0117670 A1 Apr. 30, 2015

(30) Foreign Application Priority Data

Oct. 25, 2013 (KR) ........................ 10-2013-0128118

(51) Int. Cl.
*B60Q 5/00* (2006.01)
*G10K 15/02* (2006.01)
(52) U.S. Cl.
CPC .............. *B60Q 5/008* (2013.01); *G10K 15/02* (2013.01)
(58) Field of Classification Search
CPC ................................ B60Q 5/008; G10K 15/02
See application file for complete search history.

(56) References Cited

U.S. PATENT DOCUMENTS

| 2006/0074645 | A1 | 4/2006 | Tischer |
| 2009/0028353 | A1* | 1/2009 | Kobayashi ........... G10K 11/178 381/61 |
| 2011/0044470 | A1 | 2/2011 | Ogata |
| 2012/0106748 | A1 | 5/2012 | Peachey et al. |
| 2012/0257763 | A1 | 10/2012 | Bowden et al. |

FOREIGN PATENT DOCUMENTS

CN         203047054 U      7/2010

OTHER PUBLICATIONS

Office Action dated Mar. 22, 2016 of corresponding Chinese Patent Application No. 201410344459.3—8 pages.
European Search Report and Written Opinion dated Jul. 1, 2015 of corresponding European Patent Application No. 1418 3147.9—8 pages.

* cited by examiner

*Primary Examiner* — Ping Lee
(74) *Attorney, Agent, or Firm* — Knobbe Martens Olson & Bear LLP

(57) ABSTRACT

An apparatus for controlling a virtual engine sound in response to auto-cruise speed settings may include: a controller area network (CAN) communication unit configured to receive information on one or more of auto-cruise speed settings and whether an auto-cruise function is activated, and generate a CAN signal; a control unit configured to control a virtual engine sound function in response to the CAN signal; a signal processing unit configured to process and output a virtual engine sound signal according to control of the control unit; and a digital amp unit configured to amplify the virtual engine sound signal outputted from the signal processing unit and produce a virtual engine sound.

6 Claims, 2 Drawing Sheets

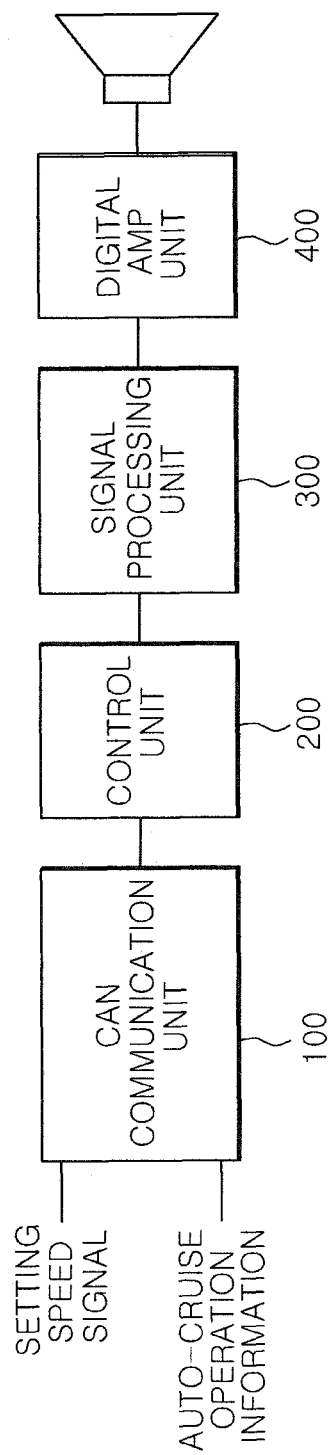

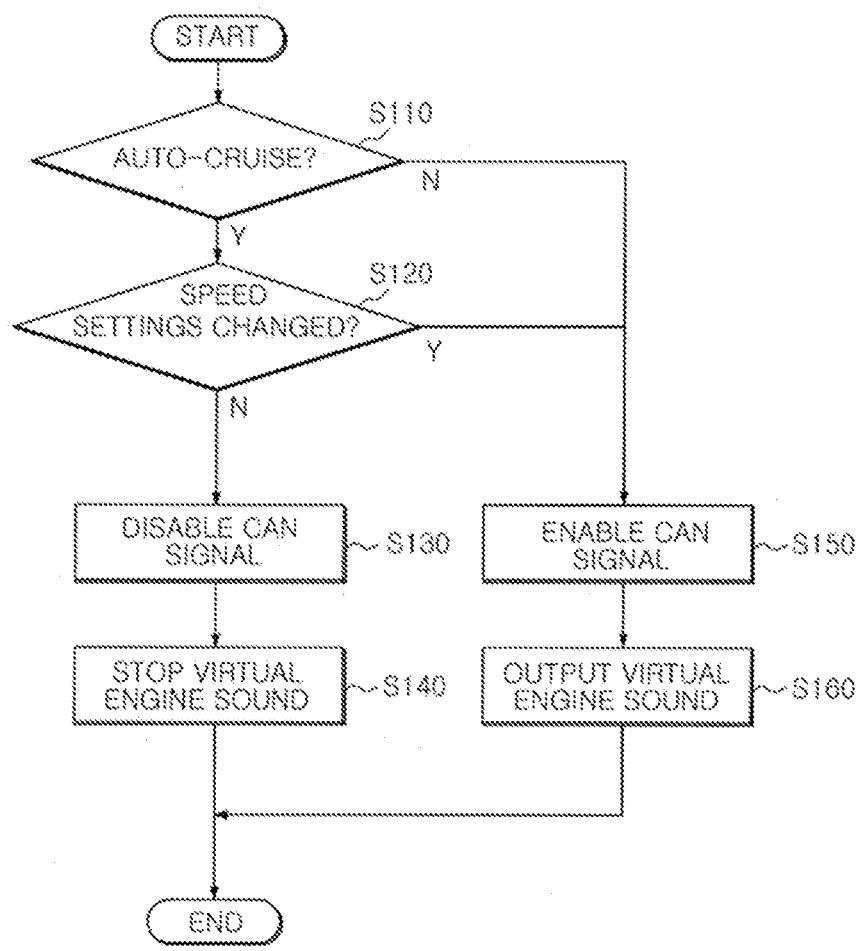

APPARATUS AND METHOD FOR CONTROLLING VIRTUAL ENGINE SOUND IN RESPONSE TO AUTO-CRUISE SPEED SETTINGS

CROSS-REFERENCES TO RELATED APPLICATIONS

The present application claims priority to Korean application number 10-2013-0128118, filed on Oct. 25, 2013, which is incorporated by reference in its entirety.

BACKGROUND

The present disclosure relates to an apparatus and method for controlling a virtual engine sound in response to auto-cruise speed settings, and more particularly, to an apparatus and method for controlling a virtual engine sound in response to auto-cruise speed settings, which determines whether to generate a virtual engine sound according to whether an auto-cruise function is activated and whether a user changes auto-cruise speed settings.

In general, a hybrid vehicle and an electric vehicle use an electric motor as a power source.

When a hybrid vehicle or electric vehicle is driven by an electric motor, the amount of noise generated from the vehicle considerably decreases. Such a situation may cause a problem in which pedestrians including visually handicapped people have difficulties in determining whether the vehicle is approaching. In order to deal with such a problem, a virtual engine sound system has been used, which outputs a virtual engine sound through a speaker such that pedestrians easily perceive the approach of the vehicle.

Thus, in order to output a virtual engine speed through the speaker, the hybrid vehicle or electrical vehicle amplifies a virtual engine sound signal using an audio amp, during operation.

The audio amp used in a vehicle may include a digital-to-analog converter (DAC) and an amplifier, and a digital amp which receives a digital sound signal and outputs the received sound signal through a speaker is used as the audio amp.

The related art is disclosed in Korean Patent Laid-open Publication No. 2004-0103430 published on Dec. 8, 2004 and entitled "Pseudo engine sound generation device and vehicle service system therefore".

SUMMARY

Embodiments of the present invention are directed to an apparatus and method for controlling a virtual engine sound in response to auto-cruise speed settings, which determines whether to generate a virtual engine sound according to whether an auto-cruise function is activated and whether a user changes auto-cruise speed settings.

In one embodiment, an apparatus for controlling a virtual engine sound in response to auto-cruise speed settings may include: a controller area network (CAN) communication unit configured to receive information on one or more of auto-cruise speed settings and whether an auto-cruise function is activated, and generate a CAN signal; a control unit configured to control a virtual engine sound function in response to the CAN signal; a signal processing unit configured to process and output a virtual engine sound signal according to control of the control unit; and a digital amp unit configured to amplify the virtual engine sound signal outputted from the signal processing unit and produce a virtual engine sound.

The CAN communication unit may enable the CAN signal when the auto-cruise function is not activated or when the auto-cruise function is activated and a driver does not change the auto-cruise speed settings, and disable the CAN signal when the auto-cruise function is activated and a driver does not change the auto-cruise speed settings.

The control unit may control the signal processing unit to not output the virtual engine sound signal when the CAN signal is disabled.

The control unit may control one or more of the operations for processing and outputting the virtual engine sound signal, based on one or more of an engine RPM and average piston speed, which correspond to a current traveling state of a vehicle.

In another embodiment, a method for controlling a virtual engine sound in response to auto-cruise speed settings may include: determining, by a CAN communication unit, whether an auto-cruise function is activated; determining, by the CAN communication unit, whether auto-cruise speed settings are changed, when the auto-cruise function is activated; generating, by the CAN communication unit, a CAN signal based on one or more of the determination results for whether the auto-cruise function is activated and whether the auto-cruise speed settings are changed; and controlling, by a control unit, a virtual engine sound function based on the CAN signal.

In the generating of the CAN signal, the CAN communication unit may enable the CAN signal when the auto-cruise function is not activated or when the auto-cruise function is activated and a driver does not change the auto-cruise speed settings, and disable the CAN signal when the auto-cruise function is activated and a driver does not change the auto-cruise speed settings.

In the controlling of the virtual engine sound function, the control unit may control the signal processing unit to not output the virtual engine sound signal when the CAN signal is disabled.

The control unit may control one or more of operations for processing and outputting the virtual engine sound signal, based on one or more of an engine RPM and average piston speed, which correspond to a current traveling state of a vehicle.

In accordance with the embodiment of the present invention, when the auto-cruise function is activated, no virtual engine sound is produced in principle. However, when the driver changes the auto-cruise speed settings, a virtual engine sound may be produced. Thus, it is possible to not only prevent the production of monotonous engine sound, but also produce a virtual engine sound similar to an actual engine sound.

BRIEF DESCRIPTION OF THE DRAWINGS

FIG. 1 is a block diagram of an apparatus for controlling a virtual engine sound in response to auto-cruise speed settings in accordance with an embodiment of the present invention.

FIG. 2 is a flowchart illustrating a method for controlling a virtual engine sound in response to auto-cruise speed settings in accordance with an embodiment of the present invention.

DESCRIPTION OF SPECIFIC EMBODIMENTS

Hereafter, an apparatus and method for controlling a virtual engine sound in response to auto-cruise speed settings in accordance with an embodiment of the invention will hereinafter be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Recently, an auto-cruise function has been widely used in vehicles. The auto-cruise function controls a vehicle to travel at a speed set by a driver, even though the driver does not perform a separate operation. The auto-cruise function is also employed in an electric vehicle.

As a communication standard through which information is exchanged between various electronic devices and an engine, which are mounted in a vehicle, and an electronic control unit (ECU), controller area network (CAN) communication may be used, and a car audio, a console, an electric motor for driving the vehicle may exchange information on operation states through the CAN communication.

In particular, when a driver sets the auto-cruise function through a vehicle interface such as the console, information on whether the auto-cruise function is activated and information on speed settings may also be transmitted through the CAN communication.

FIG. 1 is a block diagram of an apparatus for controlling a virtual engine sound in response to auto-cruise speed settings in accordance with an embodiment of the present invention.

As illustrated in FIG. 1, the apparatus for controlling a virtual engine sound in response to auto-cruise speed settings in accordance with the embodiment of the present invention may include a CAN communication unit 100, a control unit 200, a signal processing unit 300, and a digital amp unit 400.

The CAN communication unit 100 may receive information on one or more of auto-cruise speed settings and whether an auto-cruise function is activated, and generate a CAN signal.

As described above, a manipulation interface of a vehicle, such as a console (not illustrated), may transmit the information on the auto-cruise speed settings and whether the auto-cruise function is activated, to other parts of the vehicle through CAN communication.

For example, when a driver activates the auto-cruise function, the console of the vehicle may transmit auto-cruise operation information to the CAN communication unit 100 through the CAN communication. Furthermore, when the driver changes the speed settings of the auto-cruise function, the console of the vehicle may transmit the changed speed settings to the CAN communication unit 100 through the CAN communication.

The CAN communication unit 100 may receive the information on the auto-cruise speed settings or whether the auto-cruise function is activated, transmitted by the console or the like, and thus generate the CAN signal.

At this time, the CAN communication unit 100 may enable the CAN signal when the auto-cruise function is not activated or when the auto-cruise function is activated and the driver changes the auto-cruise speed settings.

Furthermore, the CAN communication unit 100 may disable the CAN signal when the auto-cruise function is activated and the driver does not change the auto-cruise speed settings.

In this case, the CAN signal may indicate the state in which a virtual engine sound is produced in consideration of whether the auto-cruise function is activated, and a virtual engine sound signal outputted from the signal processing unit 300 in response to the CAN signal may be amplified through the digital amp unit 400 to produce a virtual engine sound.

The signal processing unit 300 may process the virtual engine sound signal and output the processed signal to the amp, according to control of the control unit.

The virtual engine sound may obtained by copying an engine sound produced through a speaker such that pedestrians easily perceive the approach of a vehicle. Thus, the signal processing unit 300 may record an engine sound or process a digital sound signal which is synthesized into a sound similar to the engine sound, and output a virtual engine sound signal as a digital sound signal indicating a virtual engine sound.

The signal processing may include the volume of a virtual engine sound, mixing with a sound different from the virtual engine sound, for example, a sound outputted from a car audio, and equalizing.

The control unit 200 may control the virtual engine sound function in response to the CAN signal.

The control unit 200 may control the signal processing unit 300 to not output a virtual engine sound signal, when the CAN signal is disabled.

Furthermore, the control unit 200 may control the signal processing unit 300 to output a virtual engine sound signal, when the CAN signal is enabled.

That is, the control unit 200 may control the signal processing unit 300 to produce a virtual engine sound, when the auto-cruise function is deactivated or the driver changes the auto-cruise speed settings. Furthermore, the control unit 200 may control the signal processing unit 300 to not produce a virtual engine sound, when the auto-cruise function is activated and the driver does not change the auto-cruise speed settings.

Furthermore, when the virtual engine sound is produced, the control unit 200 may control the signal processing unit 300 to produce a virtual engine sound similar to an engine sound produced by an internal combustion engine, according to the current traveling state of the vehicle.

The engine sound of the vehicle may differ depending on a parameter of the engine, which indicates the traveling state of the vehicle, such as the RPM or average piston speed of the vehicle. Thus, the signal processing unit 300 may differently process the pitch or intensity of the virtual engine speed, depending on the parameter of the engine.

Thus, the control unit 200 may control the output of the virtual engine sound signal of the signal processing unit 300 based on one or more of the engine RPM and the average piston speed which correspond to the current traveling state of the vehicle.

The digital amp unit 400 may amplify the virtual engine sound signal outputted from the signal processing unit 300 and produce a sound.

At this time, the digital amp unit 400 may convert the virtual engine sound signal corresponding to a digital sound signal into an analog signal. Furthermore, the digital amp unit 400 may amplify the analog signal through the amplifier and drive the speaker to produce the virtual engine sound.

As described above, the apparatus for controlling a virtual engine sound in response to auto-cruise speed settings may not produce a virtual engine sound when the auto-cruise function is activated and the auto-cruise speed settings are not changed.

Thus, when the speed of the vehicle is set to a constant speed through the auto-cruise function, the engine RPM or average piston speed corresponding to the traveling state of the vehicle may not be changed, and the virtual engine sound may be set to almost a constant pitch or intensity, which makes it possible to substantially prevent the production of monotonous virtual engine sound.

FIG. 2 is a flowchart illustrating a method for controlling a virtual engine sound in response to auto-cruise speed settings in accordance with an embodiment of the present invention.

First, the CAN communication unit 100 may determine whether the auto-cruise function is activated, at step S110.

At this time, the CAN communication unit 100 may determine whether the auto-cruise function is activated, based on input information on whether the auto-cruise function is activated.

When the auto-cruise function is activated, the CAN communication unit 100 may determine whether auto-cruise speed settings are changed, at step S120.

At this time, the CAN communication unit 100 may determine whether the auto-cruise function is activated, based on input information on the auto-cruise speed settings.

When it is determined at step S120 that the auto-cruise speed settings are not changed, the CAN communication unit 100 may disable the CAN signal at step S130.

Then, the control unit 200 may control the virtual engine sound function based on the CAN signal.

At this time, the control unit 200 may control the signal processing unit 300 to not output a virtual engine sound, when the CAN signal is disabled, at step S140, and end the process. That is, the control unit 200 may control the virtual engine sound function to not output a virtual engine sound signal, based on the CAN signal.

In this case, since the CAN communication unit 100 disabled the CAN signal at step S130, the control unit 200 may control the signal processing unit 300 to not output a virtual engine sound signal at step S140.

As described above, when the auto-cruise function is activated and the driver does not change the auto-cruise speed settings, the signal processing unit 300 may output no virtual engine signal. Thus, no virtual engine sound may be produced through the digital amp unit 400.

When it is determined at step S110 that the auto-cruise function is not activated or when it is determined at step S120 that the driver changes the auto-cruise speed settings, the CAN communication unit 100 may enable the CAN signal at step S150.

Then, the control unit 200 may control the virtual engine sound function based on the CAN signal.

At this time, the control unit 200 may control the signal processing unit 300 to not output a virtual engine sound signal, when the CAN signal is enabled, at step S160, and end the process.

In this case, since the CAN communication unit 100 enabled the CAN signal at step S150, the control unit 200 may control the signal processing unit 300 to output a virtual engine sound signal at step S160.

As described above, when the auto-cruise function is not activated or the driver changes the auto-cruise speed settings, the signal processing unit 300 may output a virtual engine sound signal. Thus, the virtual engine sound may be produced through the digital amp unit 400.

In accordance with the embodiment of the present invention, when the auto-cruise function is activated, no virtual engine sound is produced in principle. However, when the driver changes the auto-cruise speed settings, a virtual engine sound may be produced. Thus, it is possible to not only prevent the production of monotonous engine sound, but also produce a virtual engine sound similar to an actual engine sound.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for providing a virtual engine sound in a vehicle, the apparatus comprising:
   a controller configured to generate virtual engine sound signals in response to a driver's commands involving a cruise control of the vehicle;
   a speaker configured to generate virtual engine sound according to the virtual engine sound signals from the controller,
   wherein the apparatus is configured to operates such that
      the virtual engine sound is generated when the vehicle is driving under a non-cruise control mode;
      the virtual engine sound is turned off and no virtual engine sound is generated when the vehicle is driving under a cruise control mode; and
      subsequently, virtual engine sound is generated in response to a command for changing the vehicle's speed to a cruising speed while the vehicle is driving under the cruise control mode.

2. The apparatus of claim 1, wherein the controller comprises:
   a CAN communication unit configured to generate CAN signals in response to the driver's commands involving the cruise control;
   a control unit configured to generate control signals in response to the CAN signals from the CAN communication unit;
   a signal processing unit configured to process the control signals from the control unit; and
   a digital amp unit configured to amplify the processed signals from the signal processing unit and to provide the virtual engine sound signals to the speaker.

3. The apparatus of claim 2, wherein the CAN communication unit disables the CAN signal in response to the driver's commands to activate the cruise control mode.

4. The apparatus of claim 3, wherein the control unit generates control signals to not output the virtual engine sound signal when the CAN signal is disabled.

5. The apparatus of claim 1, wherein the control unit is configured to adjust the virtual engine sound based on one or more of an engine RPM and average piston speed.

6. A method for providing a virtual engine sound in a vehicle, the method comprising:
   providing the apparatus of claim 1;
   generating the virtual engine sound when the vehicle is driving under a non-cruise control mode;
   turning off the virtual engine sound when the vehicle is driving under a cruise control mode; and
   subsequently, generating the virtual engine sound in response to a command for changing the vehicle's speed to a cruising speed while the vehicle is driving under the cruise control mode.

* * * * *